(12) United States Patent
Varshney et al.

(10) Patent No.: US 7,289,476 B2
(45) Date of Patent: Oct. 30, 2007

(54) METHOD AND SYSTEM TO INCREASE QOS AND RANGE IN A MULTICARRIER SYSTEM

(75) Inventors: Prabodh Varshney, Coppell, TX (US); Hannu Vilpponen, Irving, TX (US)

(73) Assignee: Nokia Corporation, Espoo (FI)

( * ) Notice: Subject to any disclaimer, the term of this patent is extended or adjusted under 35 U.S.C. 154(b) by 1043 days.

(21) Appl. No.: 10/105,705

(22) Filed: Mar. 25, 2002

(65) Prior Publication Data
US 2003/0072283 A1    Apr. 17, 2003

Related U.S. Application Data

(60) Provisional application No. 60/329,634, filed on Oct. 16, 2001.

(51) Int. Cl.
*H04B 7/212* (2006.01)
*H04B 7/216* (2006.01)
*H04J 13/00* (2006.01)
*H03M 13/00* (2006.01)

(52) U.S. Cl. .............. 370/335; 370/337; 370/342; 370/347; 714/752; 714/790

(58) Field of Classification Search ........... 370/335, 370/337, 342, 347; 714/752, 790
See application file for complete search history.

(56) References Cited

U.S. PATENT DOCUMENTS

| | | | |
|---|---|---|---|
| 5,493,563 A | 2/1996 | Rozanski et al. | 370/50 |
| 6,044,116 A | 3/2000 | Wang | |
| 6,157,683 A * | 12/2000 | Daribi et al. | 375/341 |
| 6,202,188 B1 | 3/2001 | Suzuki | |
| 6,346,874 B1 * | 2/2002 | Maeshima | 340/5.2 |
| 6,373,831 B1 * | 4/2002 | Secord et al. | 370/342 |
| 6,452,914 B2 * | 9/2002 | Niemela | 370/337 |
| 6,457,156 B1 * | 9/2002 | Stenfort | 714/785 |
| 6,681,365 B1 * | 1/2004 | Anand et al. | 714/790 |
| 6,728,323 B1 * | 4/2004 | Chen et al. | 375/340 |
| 6,868,514 B2 * | 3/2005 | Kubo et al. | 714/755 |
| 6,868,520 B1 * | 3/2005 | Fauconnier | 714/790 |

FOREIGN PATENT DOCUMENTS

EP    0841763 A1    5/1998

OTHER PUBLICATIONS

Klein, A. et. al.; XP-002085885; FRAMES Multiple access Mode 1—Wideband TDMA with and without Spreading; 5 pages.
Gudmundson, B. et. al.; XP-002071480; Evolution of the GSM Air Interface Into Wideband Services; 5 pages.
Nikula, E. et. al.XP-002071479; High Bit Rate Services For UMTS Using Wideband TDMA Carriers; 5 pages.

* cited by examiner

*Primary Examiner*—Alpus H. Hsu
(74) *Attorney, Agent, or Firm*—Harrington & Smith, PC

(57) ABSTRACT

A method and system of improving quality of service in a communication system is provided. The method includes the step of encoding a data set multiple times in a communication transmitter with the same or different error codes to form a plurality of encoded data sets. Each of the encoded data sets is then parallel or serial transmitted to a designated receiver. In addition, each of the encoded data sets may be adapted to an optimized burst structure for use in a TDMA system, CDMA system, or combination system thereof.

2 Claims, 13 Drawing Sheets

METHOD AND SYSTEM TO INCREASE QOS AND RANGE IN A MULTICARRIER SYSTEM

CROSS-REFERENCE TO RELATED APPLICATIONS

This application claims the benefit of U.S. Provisional Application Ser. No. 60/329,634, filed Oct. 16, 2001. The disclosure of this Provisional Patent Application is incorporated by reference herein in its entirety.

This application also claims the benefit of copending U.S. application Ser. No. 09/616,135, filed 13 Jul. 2000. The disclosure of this Non-provisional Patent Application is incorporated by reference herein in its entirety.

BACKGROUND OF THE INVENTION

1. Field of the Invention

The present invention relates generally to radiotelephones and radio telephone systems and, in particular, but not limited to, to time division multiple access (TDMA) cellular radio telephones, mobile stations radio communication systems and networks; and, furthermore, to GERAN based multi-carrier (MC) packet data systems that employ retransmission techniques, e.g., incremental redundancy (IR) and Universal mobile telecommunications Terrestrial Radio Access Network (UTRAN) systems; where GERAN is an composite acronym for Global Systems for Mobile communications (GSM)/Enhanced data rates for GSM Evolution (EDGE) Radio Access Network (GERAN).

2. Prior Art

It is known in the art to code information data bits with redundant code bits in order to improve the probability of a receiver receiving the information data. It will be appreciated that the higher the code rate, the ratio of redundant code bits to information bits, the lower the information data throughput and spectral efficiency.

Methods to improve the probability of reception include the use of Forward Error Correction (FEC) transmission techniques. FEC coding redundantly codes each bit to allow a receiving decoder to detect and correct transmission errors. FEC coding has several advantages over other types of error correction, such as automatic request for transmission (ARQ). For one, FEC methods do not require that the data be retransmitted before the data is received without error since FEC methods rely upon the higher probability that the information data can be successfully retrieved by the receiver's FEC decoders. This can greatly improve throughput of the transmission link. Also, since the receiver does not have to request retransmission it is possible to use one way or simplex data links and receive-only terminals or devices.

Yet, FEC decoders have a limit as to the number of errors within a transmission for which they can correct. Thus, a burst transmission traveling over a channel may experience degradation across a substantial portion of the burst length, degradation for which a FEC decoder may not be able to correct for.

In addition, it will be readily appreciated that the spectral efficiency of a communication system may be decreased with FEC coding since each information bit is redundantly coded to make the information bit more impervious to transmission errors.

As noted above, another method to ensure reception is for the receiver to automatically request retransmission (ARQ) if the data is not received or has errors. However, methods using ARQ requires a more complex receiver, e.g., a transceiver, and duplex data links. It will be appreciated that it is known to combine FEC methods with ARQ methods to produce hybrid ARQ-FEC systems. In general there are two types of hybrid ARQ systems. One type discards the erroneously received data and requests retransmission until the data is correctly received or until a pre-determined number of retransmissions has occurred. Another type stores the erroneously received data, and, using optimization techniques combines it with the next retransmitted and re-received data until the data is error free. In general, subsequent re-transmissions of this second type of hybrid ARQ method exploit incremental redundancy techniques.

Incremental redundancy (IR) techniques are based on a receiver initiated request to the transmitter to retransmit data. The transmitter then reduces the redundancy code rate, encodes the data to be retransmitted at the lower code rate, and retransmits; or transmits a different set of parity bits at the same code rate. This procedure is continued until the data is correctly received, or until a predetermined criteria has been met, e.g., a time limit has been reached.

One such form of redundant codes used to encode the information data is called puncturing codes. Puncturing codes are well known in the art and need not be discussed here. Referring to FIG. 1, there is shown a graph illustrating an example downlink performance with IR puncturing codes P1-P3. As seen, the performance of puncturing code P1 (first transmission) is poor. After the second and third retransmission at puncturing code rates P2 and P3, respectively, (decoding with P1+P2 and P1+P2+P3) the cumulative bit error rate of an individual radio link control (RLC) block may be improved, but at the expense of system throughput and delay.

Therefore, it is desirable to provide a method and system for a communication system that overcomes the disadvantages noted above.

SUMMARY OF THE INVENTION

In one embodiment of the invention, a method to improve Quality of Service (QoS) using automatic retransmission is provided. The method includes the step of automatically transmitting an IR signal in parallel (e.g. carrier 1 uses P1, carrier 2 uses P2 and carrier 3 uses P3).

In accordance with another embodiment of the invention, a method of improving quality of service (QoS) in a communication system is provided. The method includes the step of encoding a data set multiple times with the same or different error codes to form a plurality of encoded data sets. Each of the encoded data sets is then parallel or serial transmitted to a designated receiver.

In accordance with another embodiment of the invention, a system adaptable to improving quality of service in a communication system is provided. The system includes a transmitter for encoding a data set multiple times; each time with the same or different error codes, to form a plurality of encoded data sets. Each of the encoded data sets are then adapted to an optimized burst structure for communication between the transmitter and a receiver.

According to another embodiment of the invention, a communication system is provided. The communication system includes an encoder for encoding a data set with a plurality of error codes to form a plurality of encoded data sets, and a transmitter to separately transmit each of the plurality of encoded first data sets. In addition, the encoder may be an integrated circuit (IC) such as an application specific IC (ASIC), or a field programmable gate array (FPGA) The system also includes a receiver adapted to receive each of the plurality of encoded data sets.

Another embodiment of the invention is directed towards a program storage device readable by a machine, and tangibly embodying a program of instructions executable by the machine to perform method steps for encoding a data set. In addition, the step of encoding the data set further includes the step of encoding the data set with a plurality of error codes to form a plurality of encoded data sets.

BRIEF DESCRIPTION OF THE DRAWINGS

The foregoing aspects and other features of the present invention are explained in the following description, taken in connection with the accompanying drawings, wherein.

DETAILED DESCRIPTION

Figure 1:
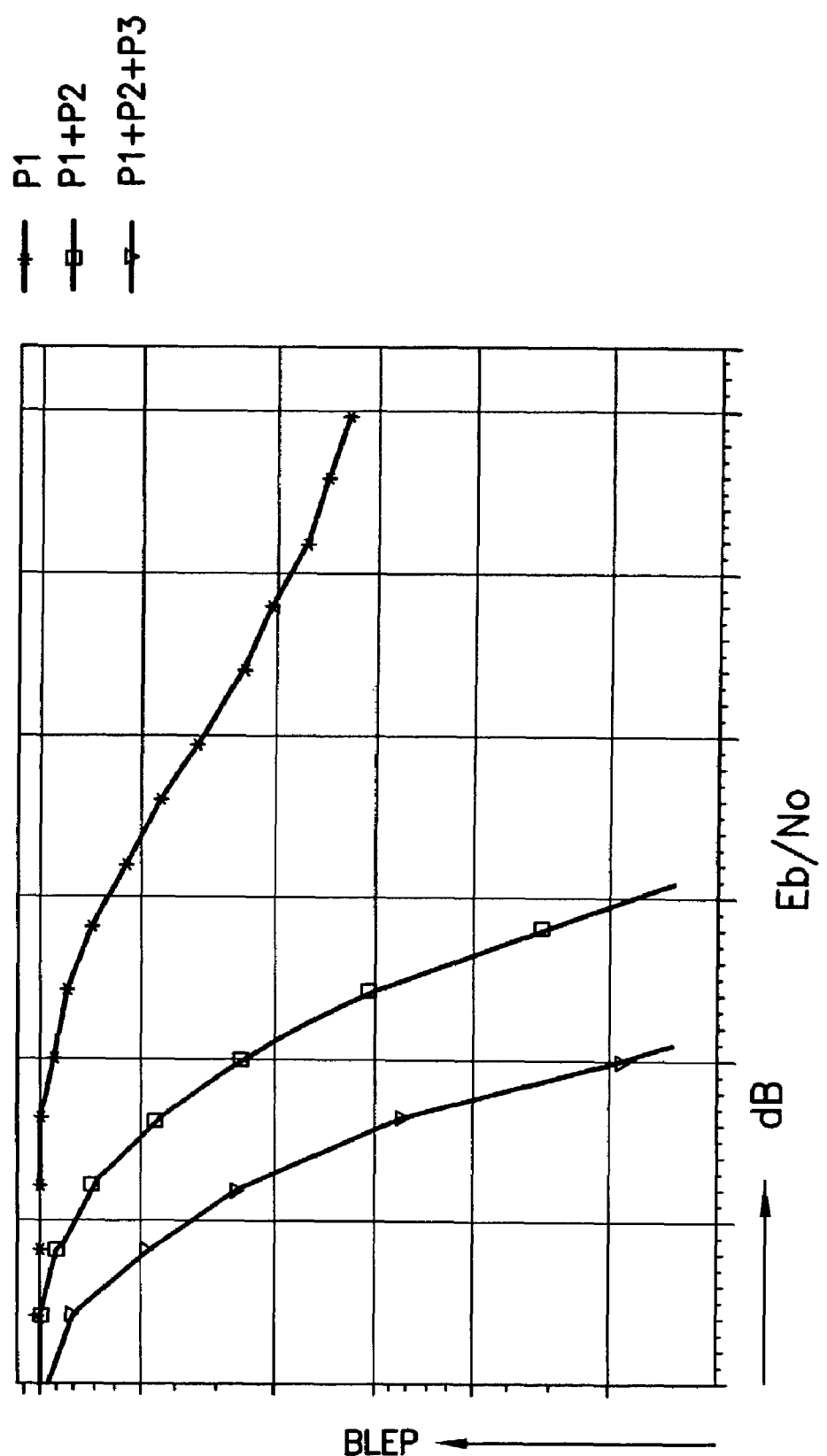
FIG. 1 shows a typical EDGE MCS-9 downlink performance using IR and ARQ.

Although the present invention will be described with reference to the embodiments shown in the drawings, it should be understood that the present invention could be embodied in many alternate forms of embodiments.

Figure 2:
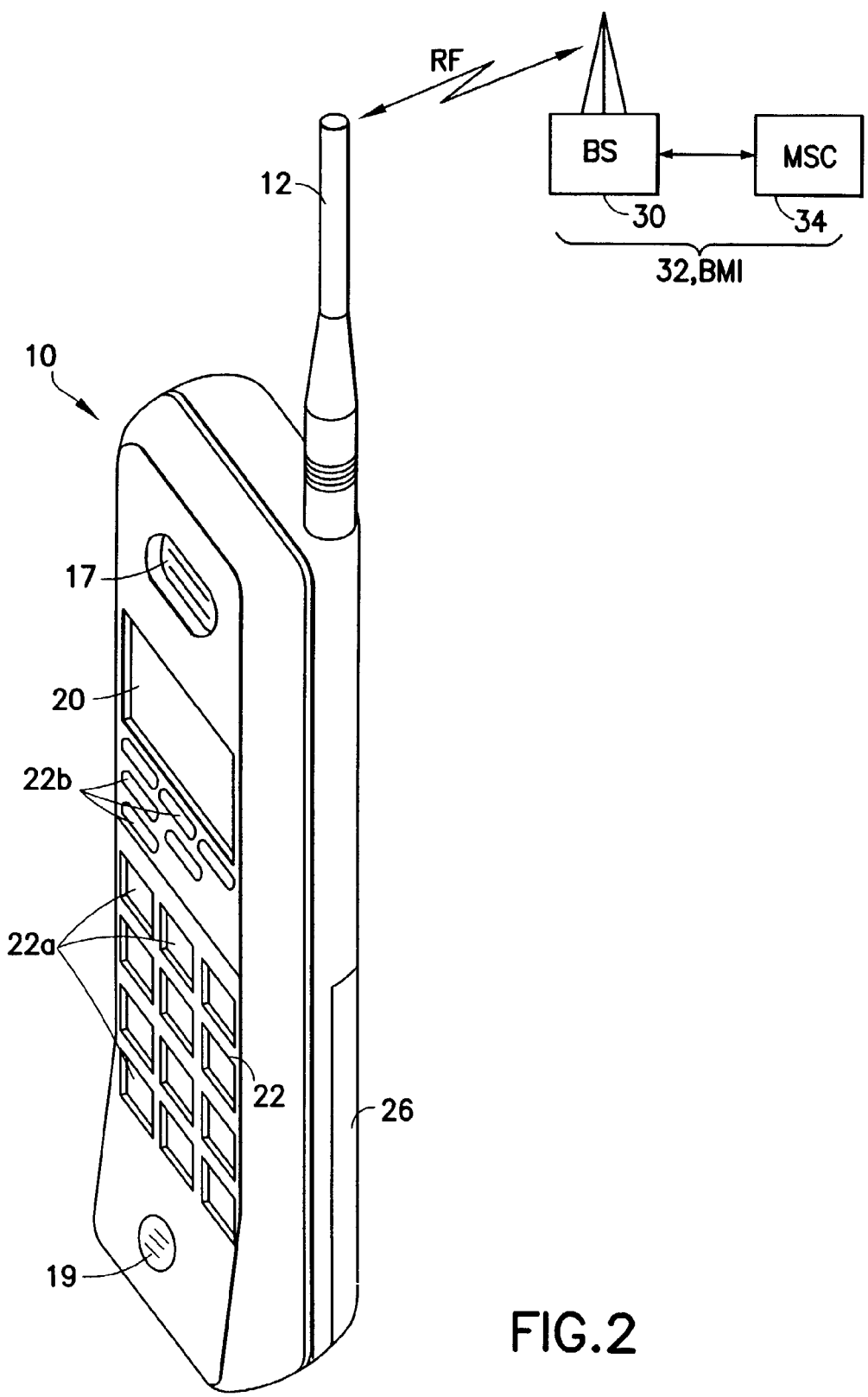
FIG. 2 is a perspective view of a cellular communication system incorporating features of the present invention.
Figure 3:
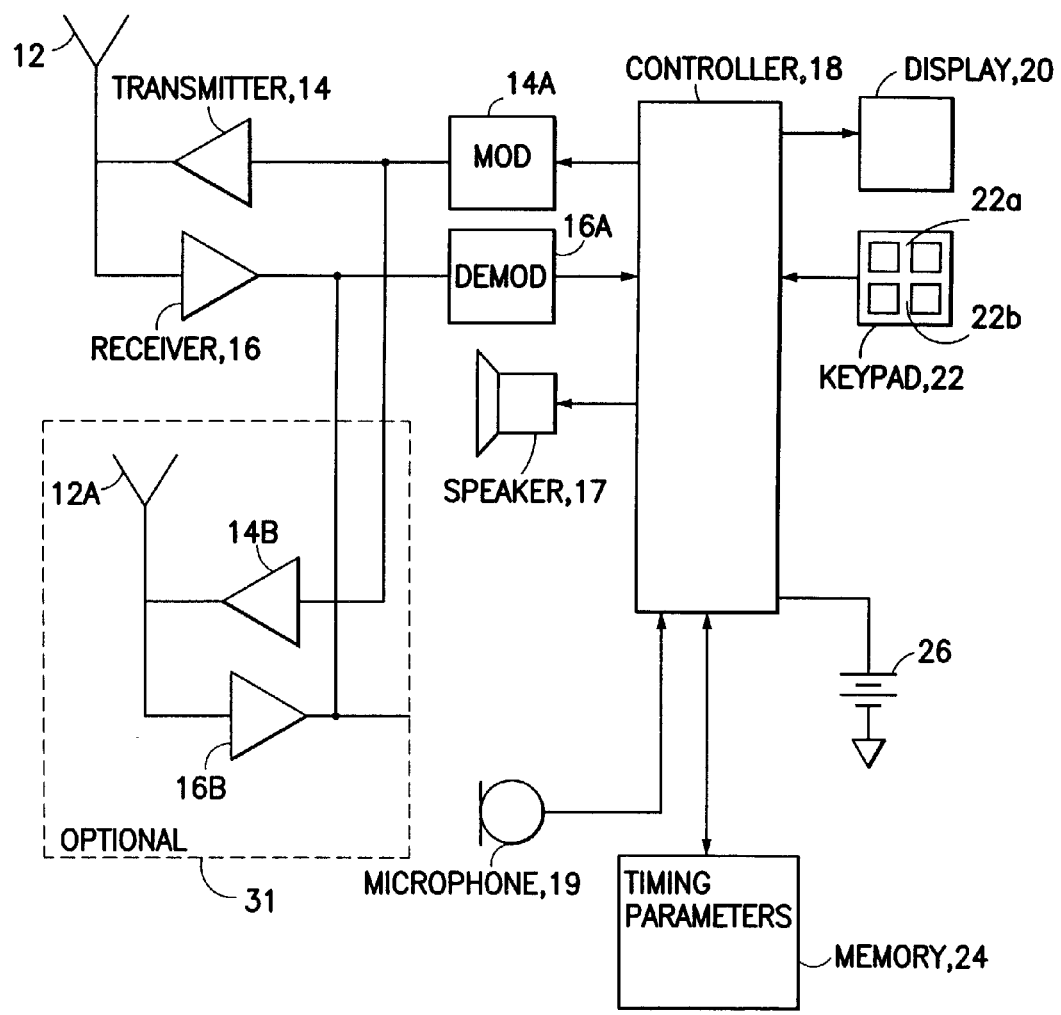
FIG. 3 is a block diagram of the mobile station shown in FIG. 2 that is constructed and operated in accordance with one embodiment of this invention.

FIGS. 2 and 3 are shown for illustrating a wireless user terminal or mobile station (MS) 10, such as but not limited to a cellular radiotelephone or a personal communicator, which is suitable for practicing this invention. The mobile station 10 includes an antenna 12 for receiving signals from a base site or base station 30, which is assumed to include a base station sub-system (BSS) as well as a base transceiver station (BTS). For simplicity, these two components are collectively referred to simply as the base station 30.

Referring now to FIG. 3, a user interface of the MS connectable to a GSM type network may include a conventional earphone or speaker 17, a conventional microphone 19, a display 20, and a user input device, typically a keypad 22, all of which are coupled to the controller 18. The keypad 22 includes the conventional numeric (0-9) and related keys (#,*) 22a, and other keys 22b used for operating the mobile station 10. These other keys 22b may include, by example, a SEND key, various menu scrolling and soft keys, and a PWR key. The mobile station 10 also includes a battery 26 for powering the various circuits that are required to operate the mobile station. The MS 10 also includes various memories, shown collectively as the memory 24, wherein are stored a plurality of constants and variables that are used by the controller 18 during the operation of the MS.

The MS includes a modulator (MOD) 14A, in some embodiments, a transmitter 14, a receiver 16, a demodulator (DEMOD) 16A, and a controller 18 that provides signals to and receives signals from the transmitter 14 and receiver 16, respectively. As represented in FIG. 3, item 31, alternate embodiments may include any suitable number of antennas and associated circuitry.

Referring to FIGS. 2 and 3, certain TDMA timing related parameters that are transmitted from the BS 30 to the MS 10, are typically stored in the memory 24 for use by the controller 18. It should be understood that the mobile station 10 could be a vehicle mounted or a handheld device or even a stationary device such as in an office local area network (LAN). It should further be appreciated that the mobile station (MS) 10 can be capable of operating with one or more air interface standards, modulation types, and access types, and may thus be dual (or higher) mode device. It will be further appreciated that one advantage of the present invention allows the use of a simplex MS or a MS operating in a simplex mode.

Figure 4:
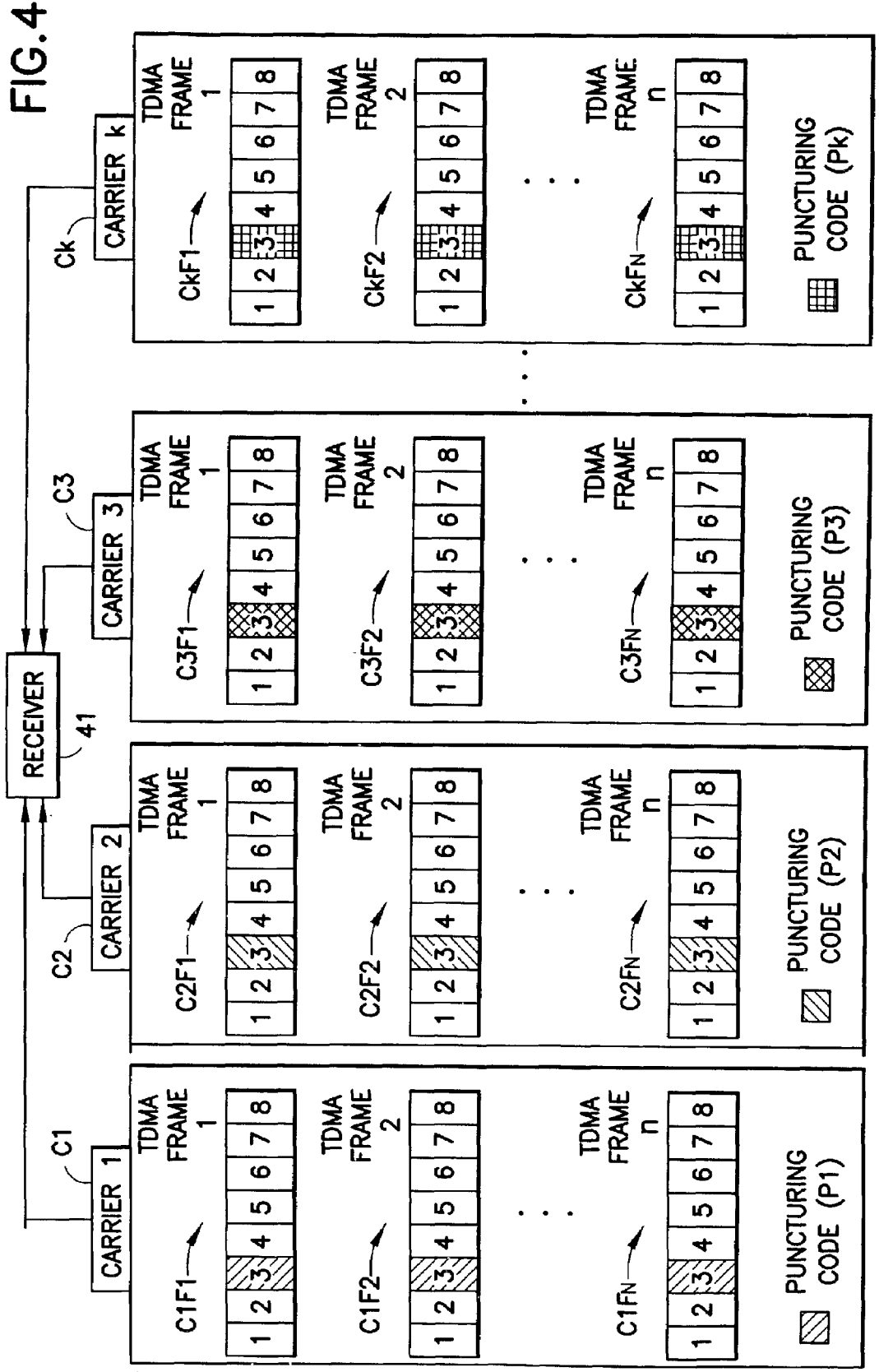
FIG. 4 is a pictorial illustration of a multiple carrier embodiment of the present invention.

Referring now to FIG. 4 there is shown an exemplary, but not limiting, example of the present invention using multiple transmission over a multiple carrier TDMA system. It will be appreciated that in alternate embodiments any suitable number of carriers or channels may be used. For example, in a hybrid TDMA—Code Division Multiple Access system (CDMA), carriers C1-C4 may be differentiated by different pseudo-random noise (PN) codes. In other systems, carriers C1-C4 may be differentiated by carrier frequency. FIG. 4 shows for each carrier, a succession of TDMA frames 1-n; where each TDMA frame is organized according to a predetermined communications protocol and transmitted to receiver 41. The TDMA frame, C1F1 for example, can be seen to consist of eight time slots 1-8. However, it will be appreciated that any suitable communications protocol may be used. Looking now at time slot (TS) 3 in each of the first TDMA frames C1F1-CKF1, it can be seen that TS 3 in TDMA frame C1F1 uses puncturing code P1, while TS 3 in TDMA frame C2F1 uses puncturing code P2, and TS3 in C3F1 uses puncturing code P3. (Puncturing codes are well known in the art and need not be discussed here.) It will be appreciated that any or all of the time slots in the TDMA frames may be encoded, but for purposes of clarity only TS 3 is shown to be encoded in FIG. 4. It will also be appreciated that the encoded information in each of the TS 3s in the first TDMA frames C1F1-CkF1 may be the same information but with different encoding. Furthermore, the encoded information between successive TDMA frames (e.g., C1F1-C1Fn) within a carrier group may be the same encoded information as the previous TDMA frame.

Thus, for example, a three carrier system transmitting encoded data increases the probability of reception, and the performance of the system is substantially that of a system using retransmission techniques (in FIG. 1 P1+P2+P3), but without the disadvantages of retransmission techniques noted earlier.

Note that puncturing codes are a form of FEC codes and that the codes can be incrementally redundant. In other words, each successive encoding of the same information could use a more complex or lower code rate. Thus, it will be appreciated that FIG. 4 shows puncturing codes P1-Pk, and that the codes can be any suitable code rate. For example, P1 may be a higher code rate than P2, P2 code rate higher than the code rate of P3, and so on. It will also be appreciated that the transmission of IR TMDA frames on different carriers, but carrying the same information greatly increases the probability of receiver 41 receiving and decoding the encoded information. It will also be appreciated that in alternate embodiments the TDMA frames may be transmitted substantially simultaneously or sequentially and that each puncturing code may be associated with a transmit frequency, a transmit PN code, and/or a transmit time.

Thus, FIG. 4 represents a three dimensional increase in probability of reception of data by receiver 41. The first dimension is the number of carriers C1-Ck, where k is predetermined. The second dimension is the number of TDMA frames (C1F1-C1Fn, C2F1-C2Fn, C3F1-C3Fn, and CkF1-CkFn) and associated TS carrying the encoded information. For example, TS 4 in TDMA frame C1F1 could carry the same encoded information as TS 3 in TDMA frame C1F1.

The third dimension is the puncturing codes. It was noted earlier that puncturing codes are a form of FEC codes and that the codes can be incrementally redundant. In other words, each successive encoding of information could use a less complex or lower code rate or even the same code rate.

Figure 5:
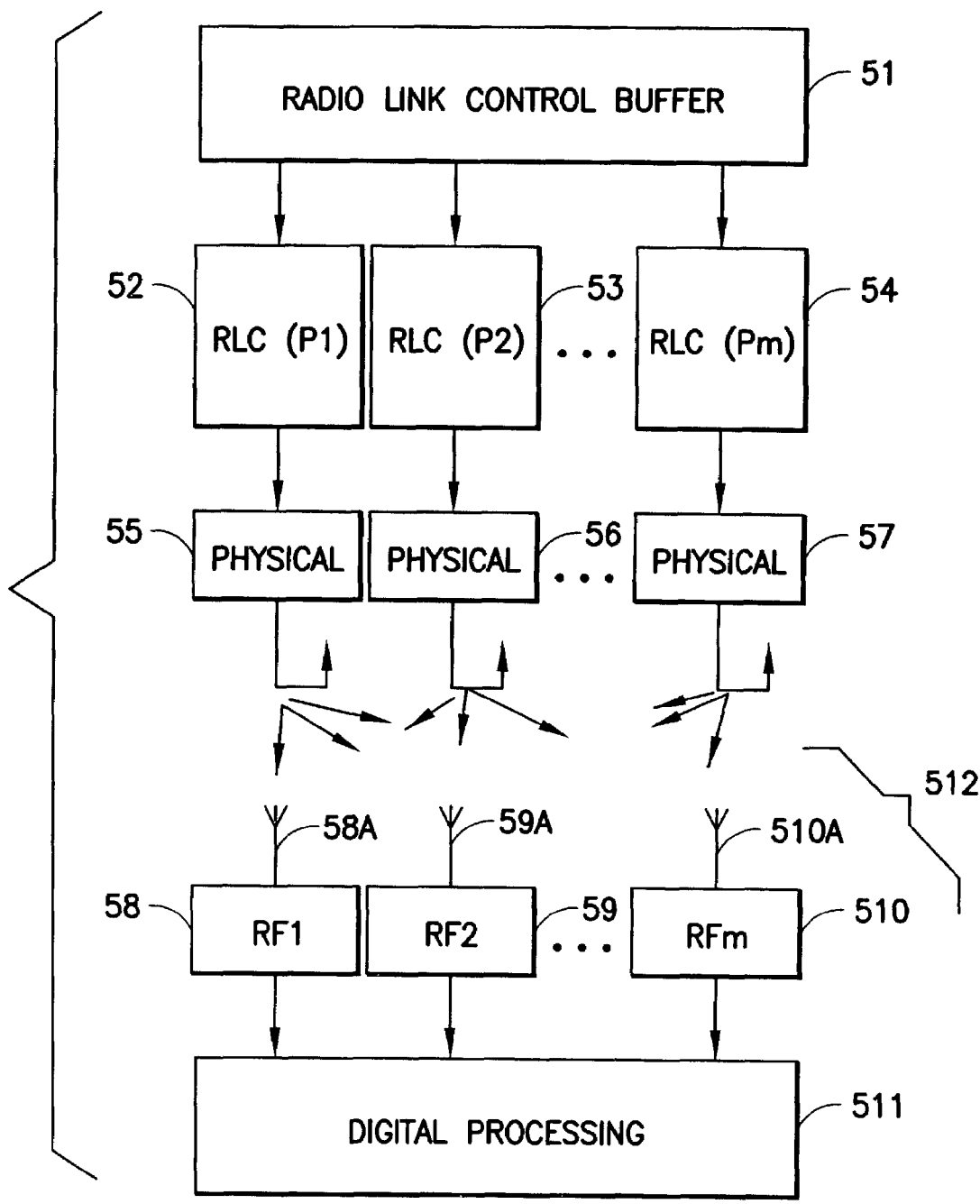
FIG. 5 is a block diagram illustrating another embodiment of the present invention in a multiple input multiple output (MIMO) system using an 8-PSK EDGE burst.

Referring now to FIG. 5 there is shown an alternate embodiment of the present invention in a multiple antenna output system. The radio link control buffer (RLC) is well known in the art and need not be discussed here. As shown in FIG. 5, the encoders 52-54 of the information provided by the RLC buffer 51 encode the information with different puncturing codes. It will be appreciated that any number of suitable antenna outputs with corresponding puncturing codes may be used. It will be further appreciated that the puncturing code rates may be the same or different from each other.

Figure 6:
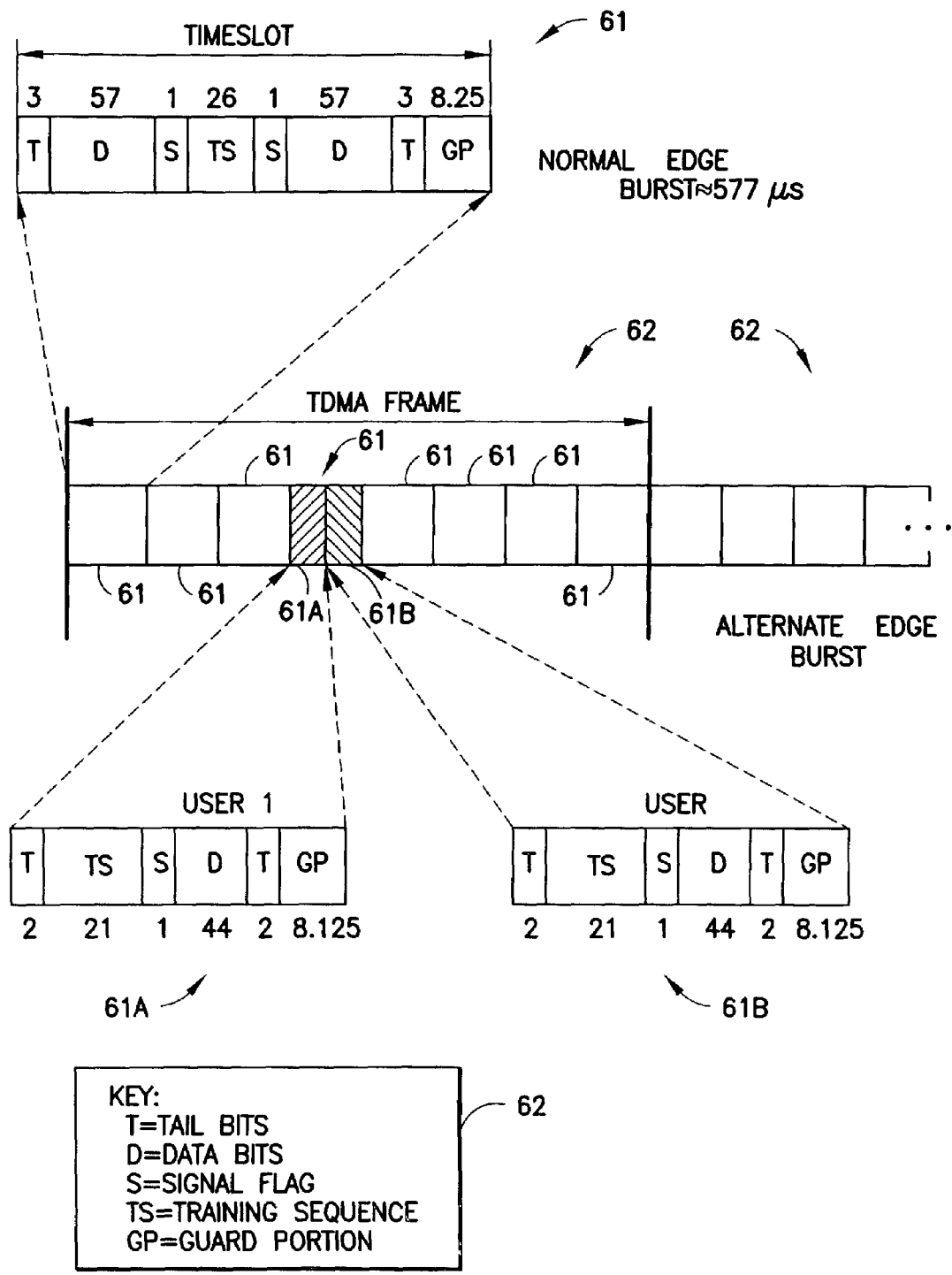
FIG. 6 is a pictorial illustration of the EDGE-PSK burst and the alternate 8-PSK EDGE burst in a TDMA frame used in FIGS. 5 and 5A, respectively.

It will also be appreciated that the physical blocks 55-57 frame the information according to a predetermined format such as shown in FIG. 6, item 61. The length of one time slot (TS) in a normal 8-PSK TDMA frame is 156.25 symbols (8-PSK) per a substantially 577 microsecond burst window. The burst structure generally contains 6 tail symbols (T), 114 data symbols (D), 2 signaling symbols (S), 26 training symbols (TS), and the guard period (GP) of length 8.25. In the substantially 577 microsecond window, each symbol is approximately 3.6928 microseconds. It will be appreciated that in alternate embodiments any suitable burst window may be used.

Figure 5A:
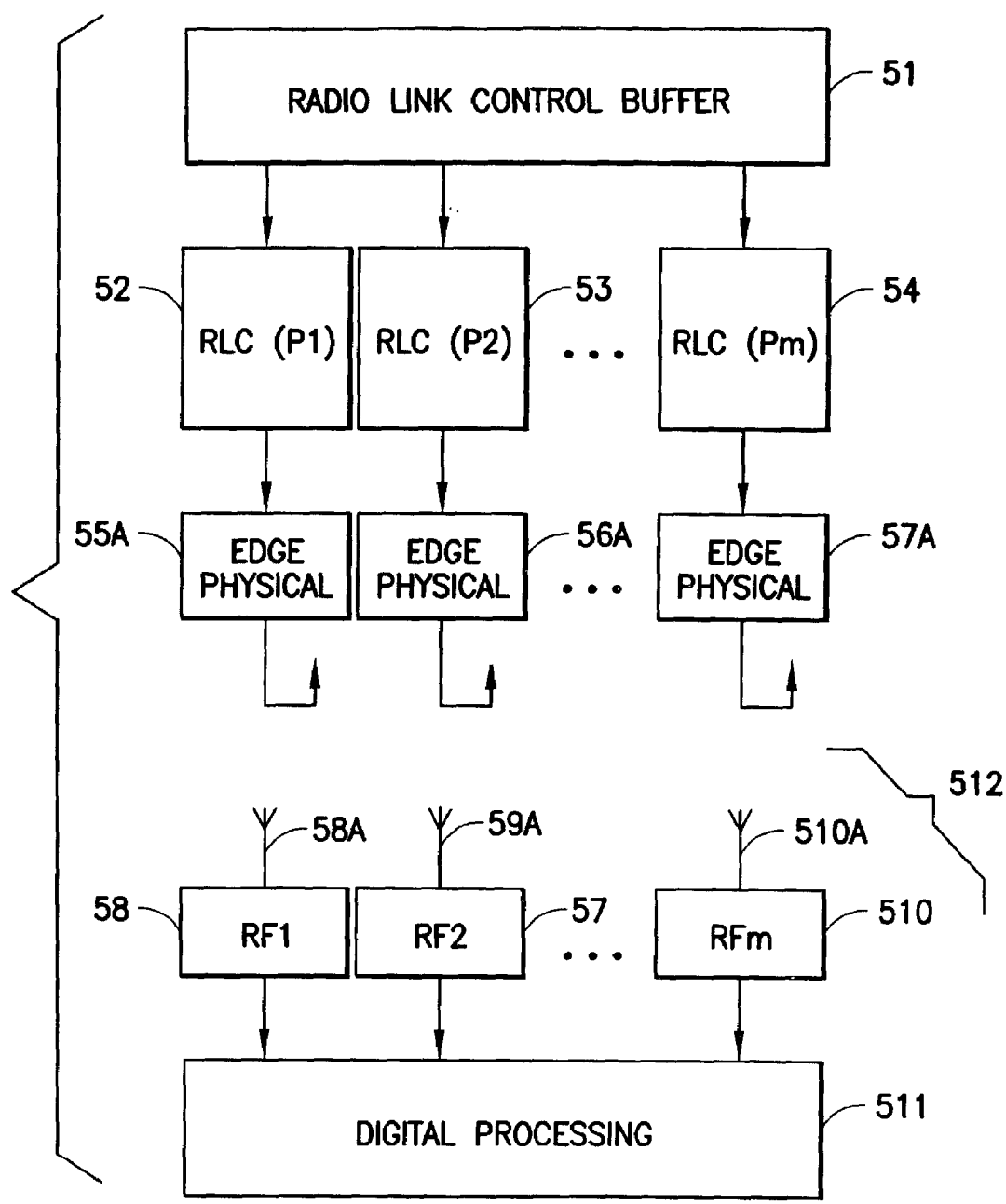
FIG. 5A is a block diagram illustrating another embodiment of the present invention in a multiple input multiple output (MIMO) system using an alternate 8-PSK EDGE burst.

Referring also to FIG. 5A there is shown an alternate physical frame structure 55A-57A. An example of an alternate physical frame structuring adapted to a normal 8-PSK EDGE burst is shown in FIG. 6, items 61A and 61B. In this embodiment the invention defines a payload unit for the EDGE/8-PSK physical layer, which is suitable for low rate real-time services. The structure of the alternate 8-PSK burst is shown in FIG. 6, items 61A and 61B. In the alternate burst structure embodiment shown in FIG. 6, the length of the alternate timeslots (ATS) 61A,61B are each one-half of the conventional TS of an 8-PSK TDMA frame. It will be readily appreciated that the length 78.125 symbols is half of the normal 156.25 8-PSK burst length. In this embodiment the shorter (approximately 288.5 microsecond burst window) 8-PSK TS burst contains 4 tail symbols (T), 21 training symbols (TS), 1 signaling symbol (S), 44 data symbols (D) and the guard period (GP) of length 8.125 symbols. With this shorter TS 8-PSK burst, two encoded transmissions per normal time slot can be supported as shown in FIG. 6. It will be appreciated that the shorter burst in the alternate burst embodiment provides desirable frequency and interference diversity and allows independent power control for each speech user.

A further advantage of the alternate burst embodiment is that the effective interleaving depth becomes longer. This has a significant impact on the layer 1 performance of low rate channels or users in EDGE. The interleaving diversity is especially improved when frequency hopping is applied.

Figure 5B:
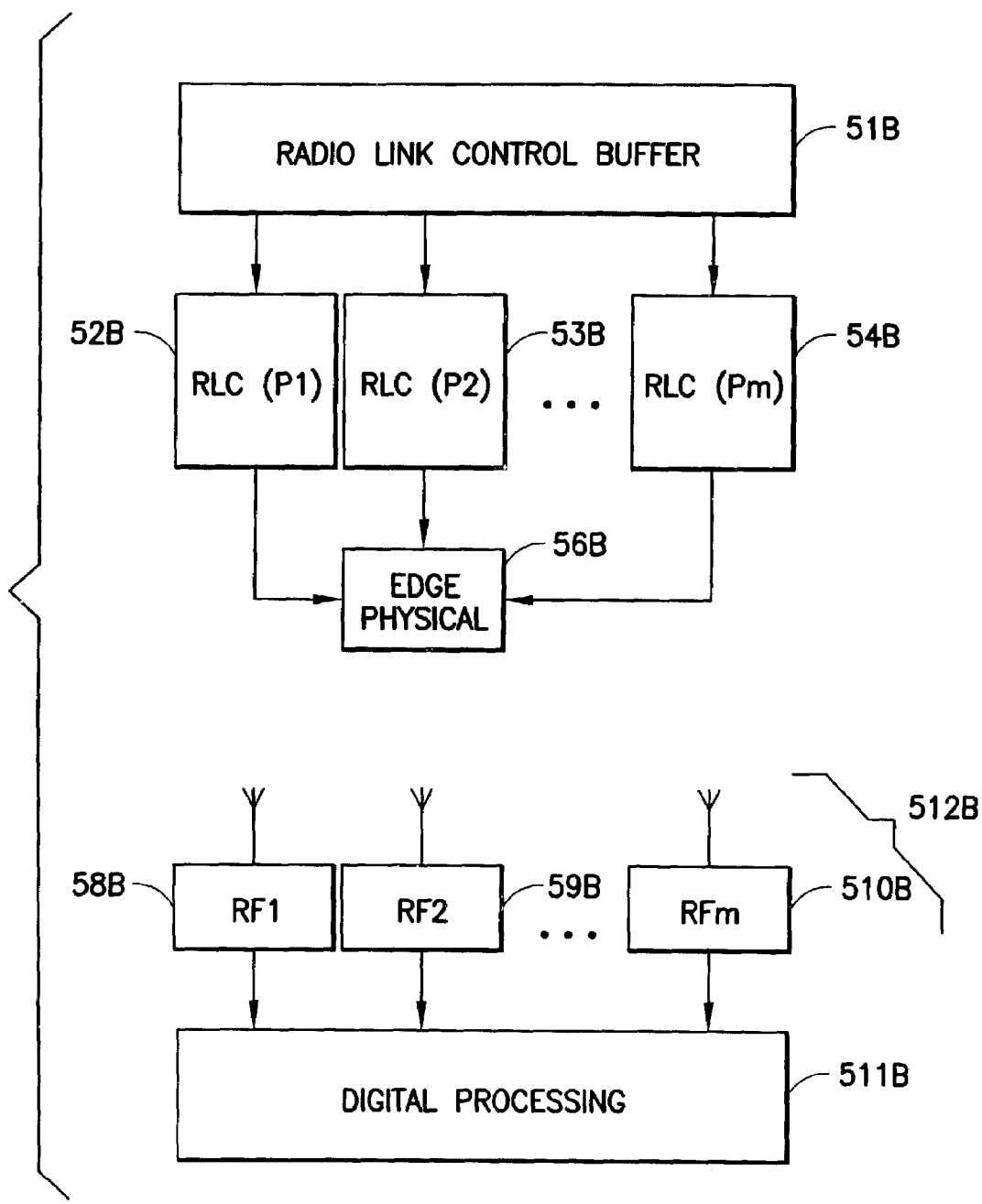
FIG. 5B is a block diagram illustrating another embodiment of the present invention in a multiple input single output (MISO) system using an 8-PSK EDGE burst.

Referring also to FIG. 5B, there is shown a block diagram of a multiple input single output (MISO) embodiment of the present invention. It will be appreciated that in the MISO embodiment the encoded data packets may be serially transmitted on a single carrier frequency, e.g., a TDMA system, or substantially parallel transmitted, e.g., a CDMA system to receiver 512B

Still referring to FIG. 6 it can be seen that the alternate frame structures 61A and 61B may be encoded with different puncturing codes. Thus, user 1 may receive two frames within one TDMA time slot but encoded with different, or in alternate embodiments, the same, puncturing codes. In this manner, frame 61A having the same information as frame 61B has a higher probability of being received by receiver 512 of FIG. 5. Radio frequency receivers 58-60 receive the transmitted physical blocks via antennas 58A,59A,510A, respectively. It will be appreciated that antennas 58A,59A, 510A may be any suitable antenna such as, for example, omni-directional or uni-directional. The received physical blocks are coupled to digital processing block 61, wherein each of the received encoded physical blocks are decoded and combined as necessary to compensate for lost or corrupted data. In alternate embodiments the digital processing of the received encoded blocks may be performed substantially simultaneously, or the processing may be time delayed. For example, if each of the puncturing codes P1-Pm is substantially more complex, i.e., a higher code rate, the digital processor 511 of FIG. 5 may decode the lower rate code first and then make a determination if further processing of the higher rate codes is necessary. Likewise, the digital processor 511 could start with the more reliable higher code rate encoded block. Either embodiment has the advantage of providing computer resources as needed.

Figure 7:
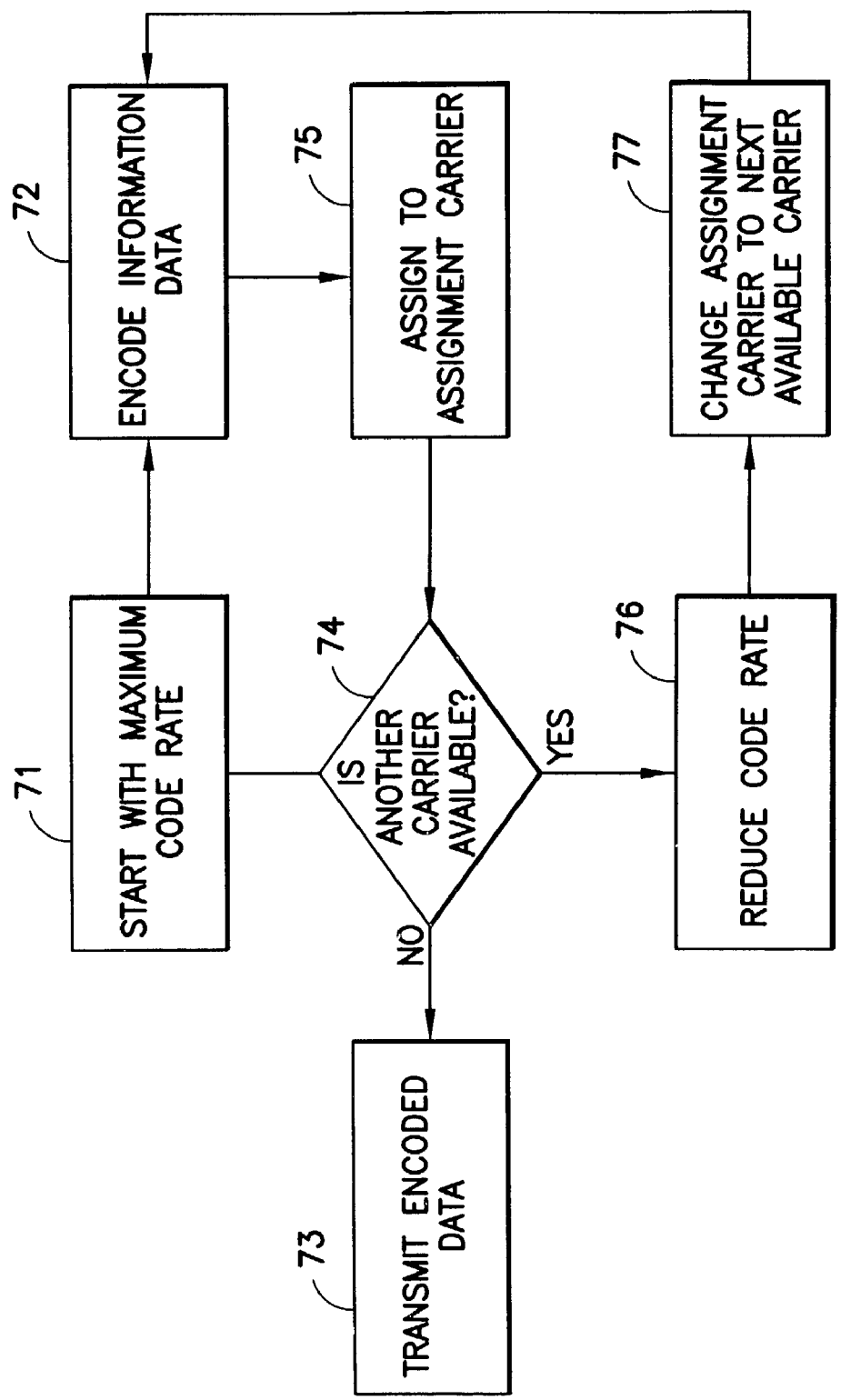
FIG. 7 is a flow chart showing method steps for encoding and transmitting information data in the multi-carrier system shown in FIG. 4.

Referring also to FIG. 7, there is shown a flow chart illustrating method steps for one embodiment of the current invention shown in FIG. 4. Step 71 starts with a maximum code rate with which to encode information data, step 72. It will be appreciated that the maximum code rate may be selected based upon the desired probability of reception, and the number of available carriers, and may be further conditioned upon environmental transmission characteristics. For example, if the desired probability of reception is 99% and the transmission channel(s) are noisy, then a higher starting code rate may be desired. Step 75 assigns the encoded information data to a designated carrier and decision step 74 determines if another carrier is available. If affirmative then step 72 reduces the code rate and step 77 changes the assignment carrier to the next available carrier. Step 72 again encodes the information data but this time with a lower code rate than was used previously. This encoding and assignment loop is continued until decision step 74 determines no more carriers are available, at which point control is coupled to step 73 to transmit, per carrier, the respective encoded information data.

Figure 7A:
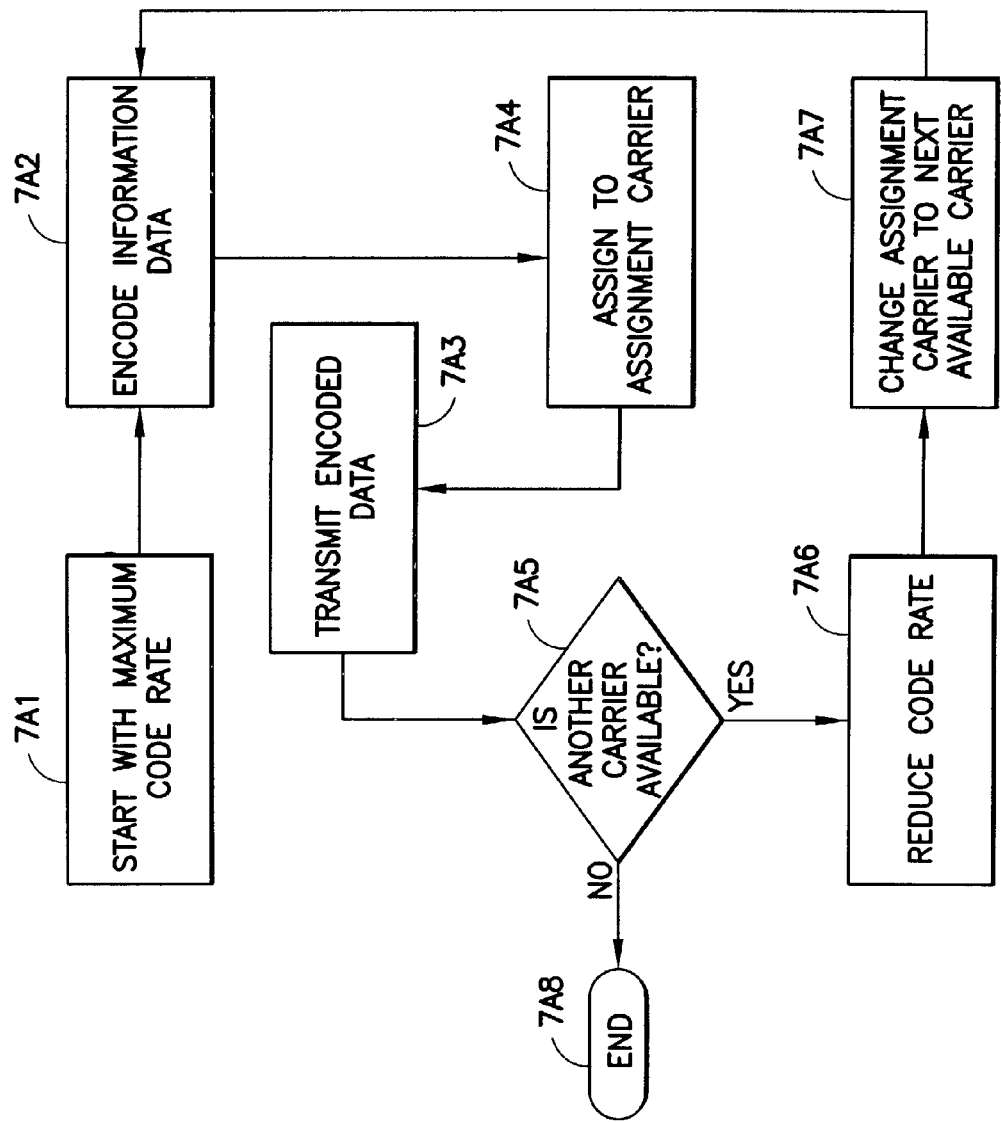
FIG. 7A is a flow chart showing alternate method steps for encoding and transmitting information data in the multi-carrier system shown in FIG. 4.

FIG. 7A illustrates the steps for an alternate embodiment of the present invention. Steps 7A1 and 7A2 select the maximum code rate and encodes the information data, respectively. Step 7A4 assigns the data to a carrier and step 73A transmits the encoded data on the assigned carrier. Step 7A5 determines if another carrier is available. If affirmative, steps 7A6 and 7A7 reduce the code rate and change carrier assignment to the next available carrier, respectively. Steps 7A2,7A4, and 7A3, again encodes the data, assigns to the assignment carrier, and transmits the encoded data over the assignment carrier, respectively. This loop is continued until no more carriers are available at which point decision block 7A5 transfers control to step 7A8 which ends the loop. It will be appreciated that in alternate embodiments, that once the encoded data has been transmitted over the assigned carrier, the carrier may be again be available for assignment.

Figure 7B:
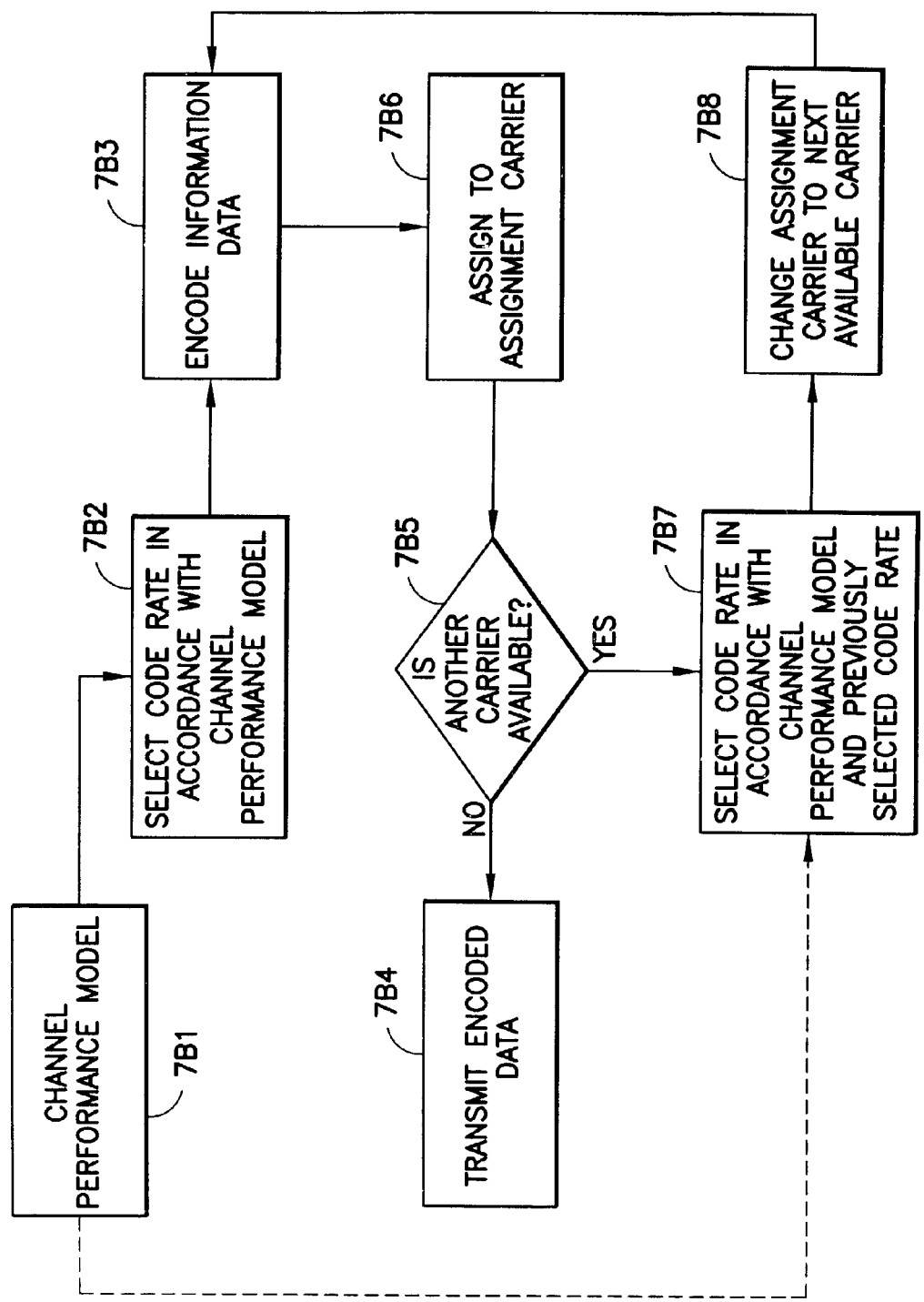
FIG. 7B is a flow chart showing alternate method steps for encoding and transmitting information data in the multi-carrier system shown in FIG. 4.

Referring now to FIG. 7B there is shown method steps for another alternate embodiment of the current invention; here step 7B2 selects a code rate in accordance with a channel performance model 7B1. The channel performance model may be any suitable model for estimating environmental channel conditions and the probable bit error rate in order for step 7B2 to make a starting code determination to increase the probability of reception by a designated receiver. In alternate embodiments the channel performance model may be a look-up-table for predicting channel performance and hence the desirable starting code rate selected by step 7B2. Steps 7B3 and 7B6 encode and assign the information data to the assignment carrier, respectfully. Step 7B5 determines if another carrier is available. If affirmative, a new code is selected by step 7B7 in accordance with the previously selected code and the channel performance model. In this embodiment the encoding and assigning loop is continued until step 7B5 determines that no more carriers are available. Step 7B4 then transmits the encoded data.

Figure 8A:
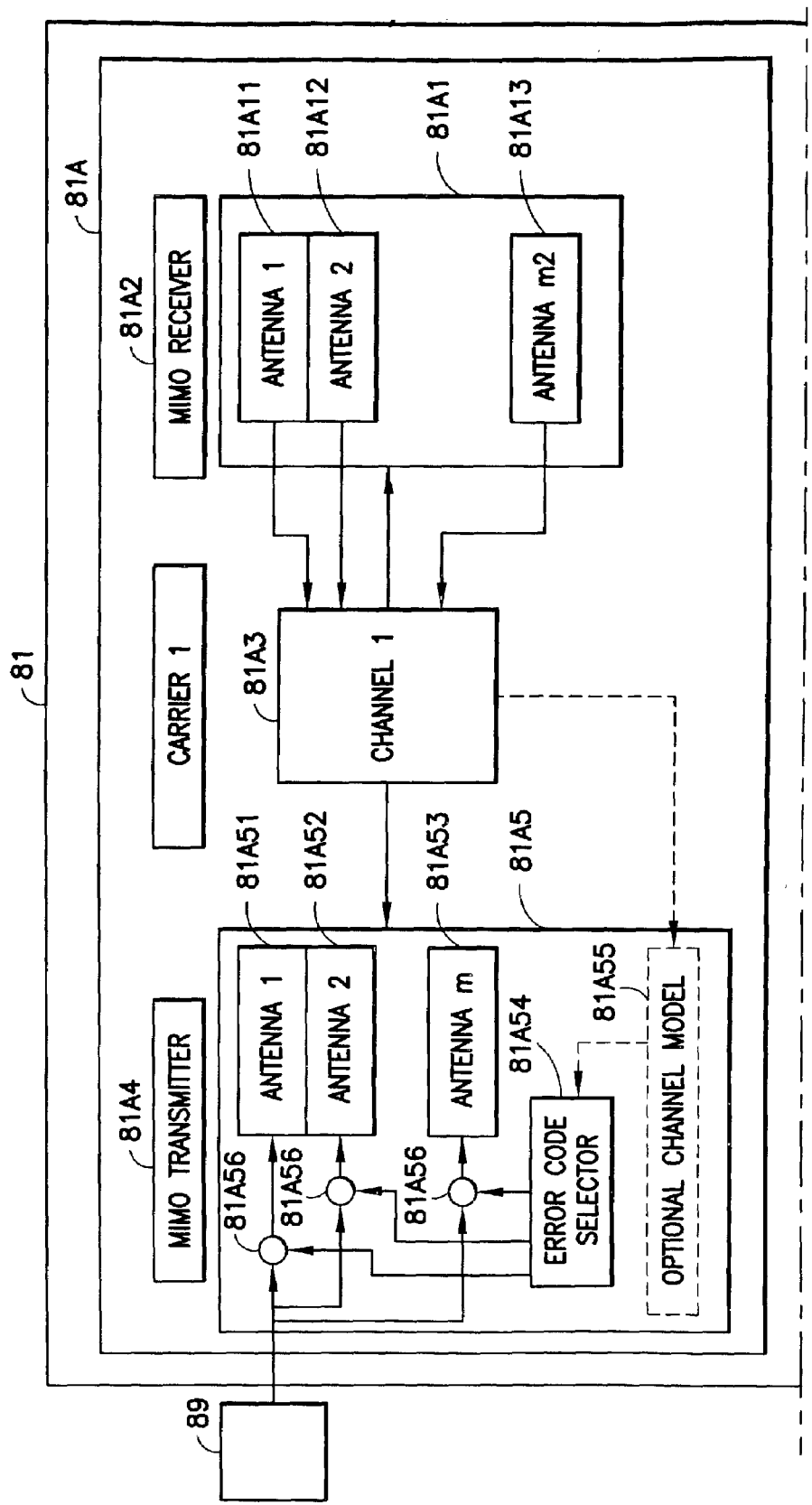
FIG. 8 is a block diagram of a MIMO+MC architecture illustrating features of the present invention.
Figure 8B:
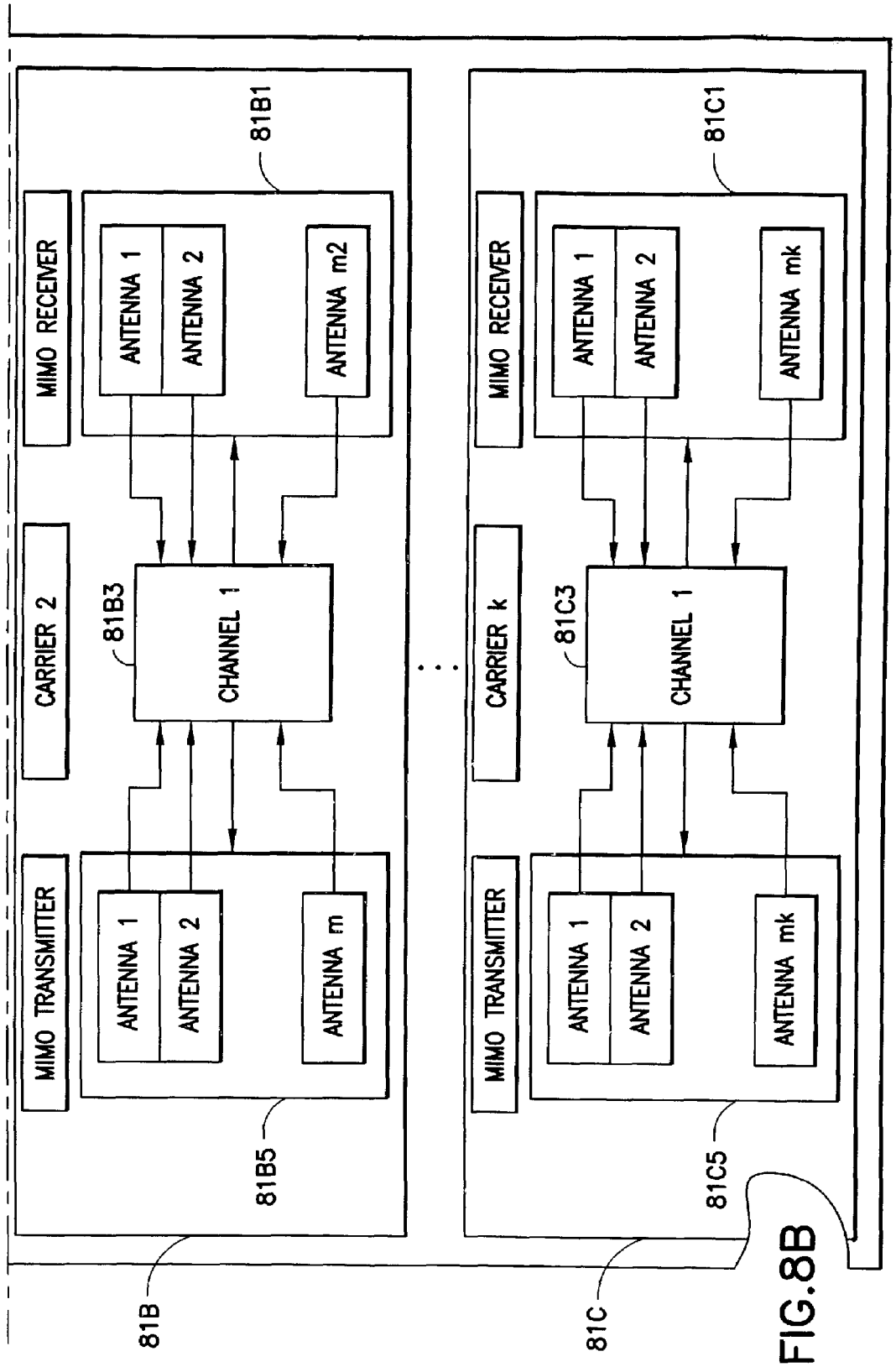

Referring now to FIG. 8 there is shown an alternate embodiment of the present invention in a system 81 incorporating features of the multiple carrier system shown in FIG. 4 and the MIMO system shown in FIG. 5. Here, for each available carrier, carrier 1-k, there are multiple transmission antennas 81A51-81A53. Each transmission antenna is fed by a respective encoder 81A56. Each coder encodes information data provided by information block 89. The code with which each encoder codes the information data is provided by error code selector 81A54. In addition, the error coding may be any suitable coding to be decoded by a forward error code (FEC) decoder, such as, for example, a hard decision Viterbi decoder, a soft decision Viterbi decoder, or a Reed/Solomon decoder. It will also be appreciated that each code provided may be incrementally redundant or otherwise related, or the same. In addition, in alternate embodiments the error code selector may be influenced by an optional channel performance model 81A55. The channel 81A3 may be any suitable transmission channel. Similar to the previous MIMO discussion, MIMO receiver 81A1 receives the encoded information data and decodes according to FEC decoding procedures. Carriers 81B and 81C operate in a similar fashion to carrier 81A. It will also be appreciated that the MIMO receivers may decode serially or in parallel.

It will be further appreciated that the invention advantageously provides fast, high quality link connections, with long range, in addition to providing bandwidth on demand. It will also be appreciated that the invention advantageously extends link throughput by allowing error-coding schemes that are less complex than typical coding schemes used to overcome poor transmission channel conditions. Also, in either the MS or BS side, alternate embodiments of the invention could be implemented in either DSP code or a Very High Speed Integrated Circuit (VHSIC) Hardware Description (VHDL) Language file, typically used for programming FPGAs, or in an IC such as an application specific integrated circuit (ASIC) or a field programmable gate array (FPGA).

It should be understood that the foregoing description is only illustrative of the invention. Various alternatives and modifications may be devised by those skilled in the art without departing from the invention. In addition, although the invention has been described with regard to EDGE-8 burst structures it will be appreciated that any suitable burst structure may be used.

What is claimed is:

1. A method of transmitting a forward error corrected data set comprising:

encoding a data set with a first error code to form a first encoded data set;

encoding the data set with a second error code to form a second encoded data set; and transmitting each of the first and second encoded data sets to a receiver in the absence of a prior request by the receiver to retransmit the data set;

wherein the transmitting is within a time division multiple access (TDMA) communication system, wherein encoding the data set with the first and second error codes to form respective first and second encoded data sets comprises formatting the first and second encoded data sets in respective first and second burst TDMA frame structure, and wherein each of the first and second burst TDMA frame structures comprise a length that is substantially 78.125 symbols comprising:

2 symbols designated as first tail portion;

21 symbols designated as a training sequence portion following the first tail portion;

1 symbol designated as a signal flag portion following the training sequence portion;

44 symbols designated as a data portion following the signal flag portion;

2 symbols designated as a second tail portion following the data portion; and 8.125 symbols designated as a guard portion following the second tail portion.

2. A method of transmitting a forward error corrected data set comprising:

encoding a data set with a first error code to form a first encoded data set;

encoding the data set with a second error code to form a second encoded data set; and transmitting each of the first and second encoded data sets to a receiver in the absence of a prior reQuest by the receiver to retransmit the data set;

wherein the transmitting is within a time division multiple access (TDMA) communication system, wherein encoding the data set with the first and second error codes to form respective first and second encoded data sets comprises formatting the first and second encoded data sets in respective first and second burst TDMA frame stucture, and wherein each of the first and second burst TDMA frame structures comprise a length that is substantially 78.125 symbols comprising:

2 symbols designated as first tail portion;

22 symbols designated as a first data portion following the first tail portion;

1 symbol designated as a signal flag portion following the first data portion;

21 symbols designated as a training sequence portion following the signal flag portion;

22 symbols designated as a second data portion following the training sequence portion;

2 symbols designated as a second tail portion following the second data portion; and 8.125 symbols designated as a guard portion following the second tail portion.

* * * * *